United States Patent [19]

McDonald

[11] Patent Number: 5,044,511

[45] Date of Patent: Sep. 3, 1991

[54] MANUFACTURE AND METHOD OF PRODUCING A RESILIENT DIAPHRAGM SUITABLE FOR LIQUID PRESSURE TANKS

[75] Inventor: Hugh McDonald, Boronia, Australia

[73] Assignee: Davey Products Pty. Ltd., Huntingdale, Australia

[21] Appl. No.: 514,823

[22] Filed: Apr. 26, 1990

[30] Foreign Application Priority Data

Apr. 27, 1989 [AU] Australia ............................ PJ3918

[51] Int. Cl.$^5$ .......................................... F16L 55/00
[52] U.S. Cl. .................................... 220/85 B; 138/30
[58] Field of Search .................. 220/85 A, 85 B, 403, 220/404, 410, 470, DIG. 12, DIG. 13; 138/26, 30

[56] References Cited

U.S. PATENT DOCUMENTS

| 2,805,684 | 9/1957 | Love | 138/30 |
| 3,121,993 | 2/1964 | Pennington | 220/85 B X |
| 3,143,144 | 8/1964 | Peet | 138/30 |
| 3,424,201 | 1/1969 | Sugimura et al. | 138/30 |
| 3,473,565 | 10/1969 | Blendermann | 138/30 X |
| 4,784,182 | 11/1988 | Sugimura | 138/30 |

Primary Examiner—Steven M. Pollard
Attorney, Agent, or Firm—Jeffers, Hoffman & Niewyk

[57] ABSTRACT

A thin walled membrane type diaphragm particularly for liquid pressure accumulators and a method of production is disclosed comprising membrane made from rubber, synthetic rubber, P.V.C. or like suitable material including a neck portion forming the opening of the diaphragm and adapted to be mounted in the neck of a pressure tank and a closed tank region or body region which is formed from cruciform pleats which may be symmetrical such that the dimension of the body portion is reduced for a given volume of body region.

The moulding of the diaphragm in this form enables a diaphragm of greater internal capacity to be moulded in a given sized injection moulding such that the core size of the moulding machine can be readily removed through the base region of the diaphragm.

5 Claims, 2 Drawing Sheets

Sect BB

MANUFACTURE AND METHOD OF PRODUCING A RESILIENT DIAPHRAGM SUITABLE FOR LIQUID PRESSURE TANKS

This invention relates to diaphragms comprised of a thin walled membrane and particularly to a method of manufacture thereof for use with but not exclusively water pressure tanks.

Conventional diaphragms for use in water pressure tanks (for instance) are moulded in a mould having a solid central core and a matching outer mould that has a relatively small neck that can be fitted to a relatively small and therefore low cost closing flange.

Such mouldings are usually formed with rubber or synthetic rubber utilizing injection moulding or rotational moulding techniques. Other materials may be used such as plasticized polyvinylchloride (P.V.C.) in specific applications to allow the use of blow moulding techniques. Furthermore it may be possible to use blow moulding techniques with some synthetic rubber materials.

Such procedures and materials are intended to be included with the ambit of this specification and such materials and methods where applicable are not to be excluded therefrom.

It will be appreciated that the diaphragm of such configuration may have other applications where large volumes associated with a relatively small neck opening are required.

There are difficulties in moulding such diaphragms where the neck is reduced to a minimum dimension for the reason that it is difficult to remove the diaphragm so moulded from the mould core.

Therefore it is necessary with conventional injection moulding methods for the neck diameter to have a certain minimum dimension in order that the diaphragm can be easily removed from the core of the tool.

The principal objective of the present invention is to provide a method of production of a diaphragm and a diaphragm made thereby wherein the ratio of the neck diameter of the diaphragm compared to the largest lateral dimension of the diaphragm is greater than in conventional production methods.

There is provided according to the present invention a method of production of a diaphragm comprising a thin walled membrane comprising two regions of differing geometry, one region including a neck region incorporating the opening of the diaphragm and a second region forming the body of the diaphragm, said second region being moulded in a pleated configuration such that the overall lateral dimension is small relative to the overall volume of the body region so moulded.

Conveniently, in accordance with the invention, there is provided a diaphragm adapted for pressure tank application and includes a thin walled membrane made from rubber, synthetic rubber, P.V.C. or like suitable material including a neck portion forming the opening of the diaphragm and adapted to be mounted in the neck of a pressure tank and a tank region or body region which is formed from cruciform pleats which may be symmetrical such that the dimension of the body portion is reduced for a given volume of body region.

The moulding of the diaphragm in this form enables a diaphragm of greater internal capacity to be moulded in a given sized injection moulding machine such that the core size of the moulding machine can be readily removed through the base region of the diaphragm. In fact, the formation of the pleated section according to the invention enables the diameter of the opening of the tank to be further reduced for a given diaphragm volume given that the maximum ratio of the largest dimension of the diaphragm is against the diameter of the opening of the diaphragm can be considerably increased by use of the present invention.

Accordingly, the present invention enables the formation of a diaphragm by conventional injection moulding techniques or the like as compared to more difficult and complicated rotational moulding techniques which is currently utilized in the formation of larger dimension diaphragms because of the difficulty in removing the inner core from the formed diaphragm.

Furthermore the diaphragm of the invention may be formed using known blow moulding techniques. In such a process the use of suitable plasticized polyvinylchloride (P.V.C) materials are preferred.

The pleated construction of the body region of the diaphragm provides for a large increase in expanded volume of the diaphragm as compared with its relaxed volume. The construction allows relative movement of the diaphragm and the pressure tank with little or no frictional or scuffing contact thereby minimizing potential damage to the diaphragm. Further the construction lends itself to use of materials having a relatively resilience and expansion qualities allowing it the use of substitute for synthetic rubbers such as plasticized P.V.C. which are easier to mould by blow moulding techniques.

Alternatively, a diaphragm with a relatively larger neck diameter must be formed to allow removal of the inner core.

Pleated flexible liners of tubular form are known in the prior art literature as evidenced by U.S. Pat. No. 3,727,642 referring to an engine cooling system including a vacuum compensating device having a flexible liner of open ended tubular construction mounted within a bracket adjacent to a cooling radiator.

It will be appreciated that the manufacture of an open ended tubular liner of this type does not present any difficulties as compared with the formation of a diaphragm of the type described herein having a single opening or neck and a body of relatively large lateral dimension compared to the dimension of the neck.

The present invention will be described in greater detail with reference to the accompanying drawings in which.

Figure 1:
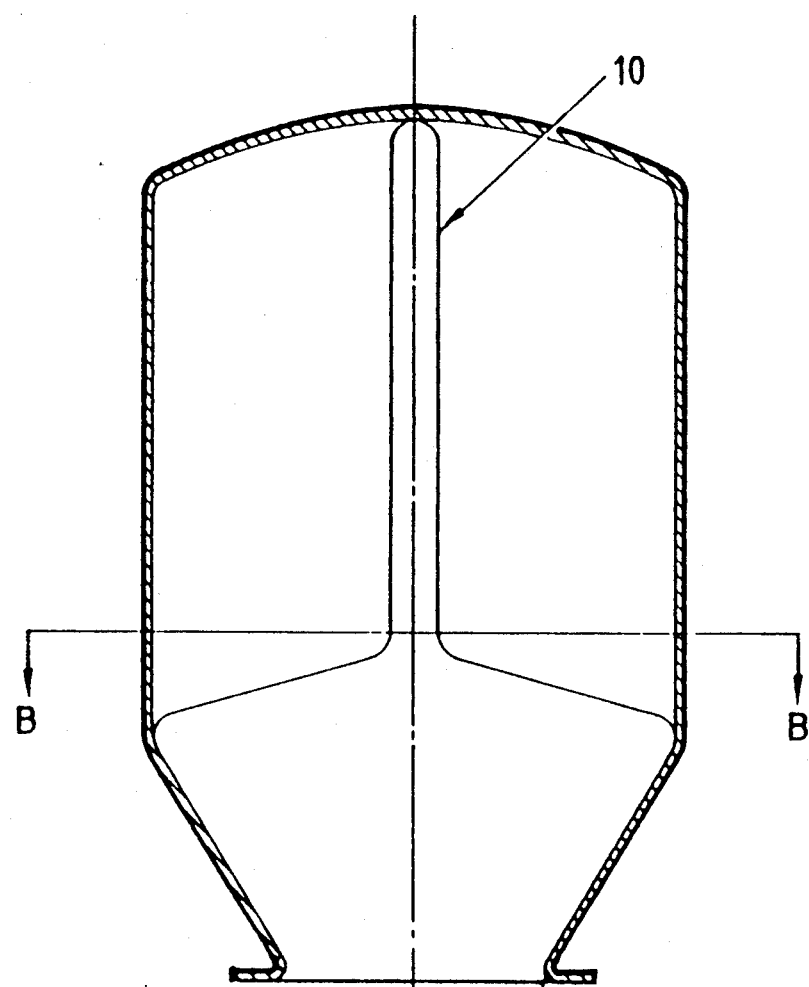
FIG. 1 shows a section AA of the diaphragm according to the invention.
Figure 2:
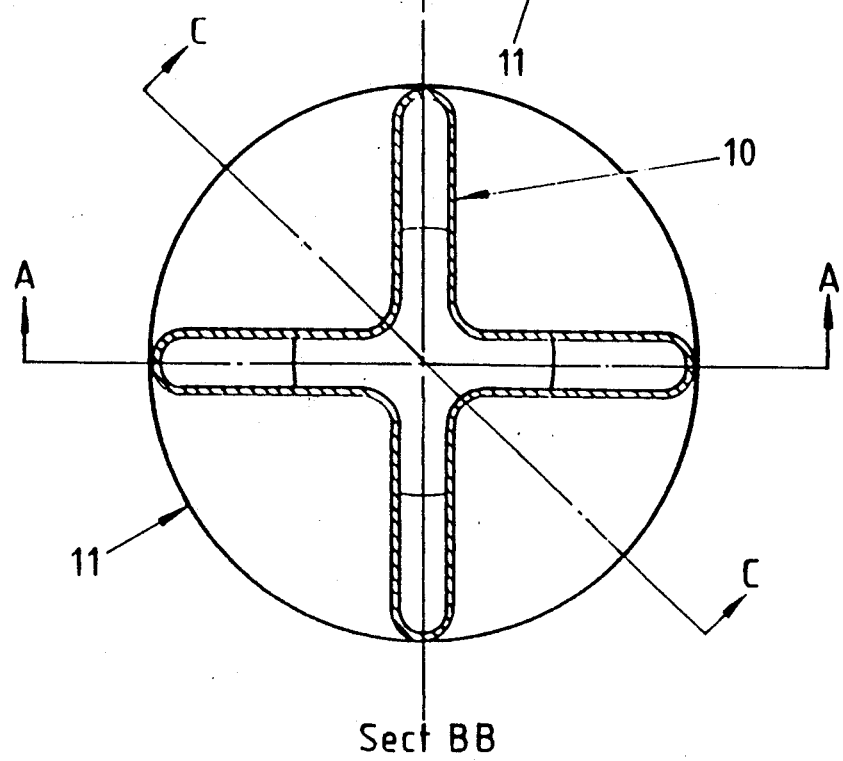
FIG. 2 shows a section of the diaphragm through BB of the body region.
Figure 3:
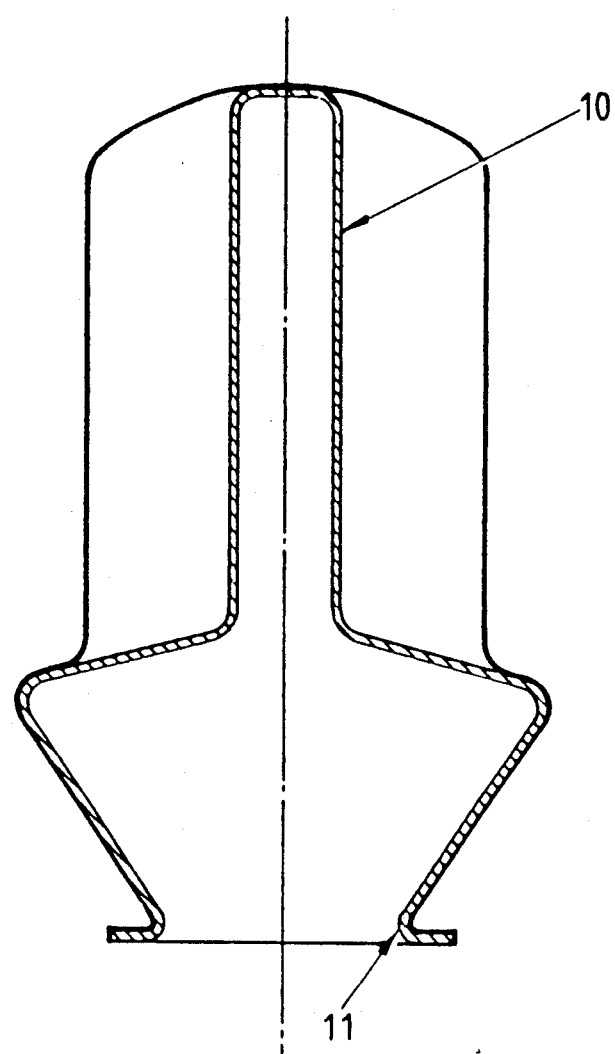
FIG. 3 shows a section CC of the diaphragm.
Figure 4:
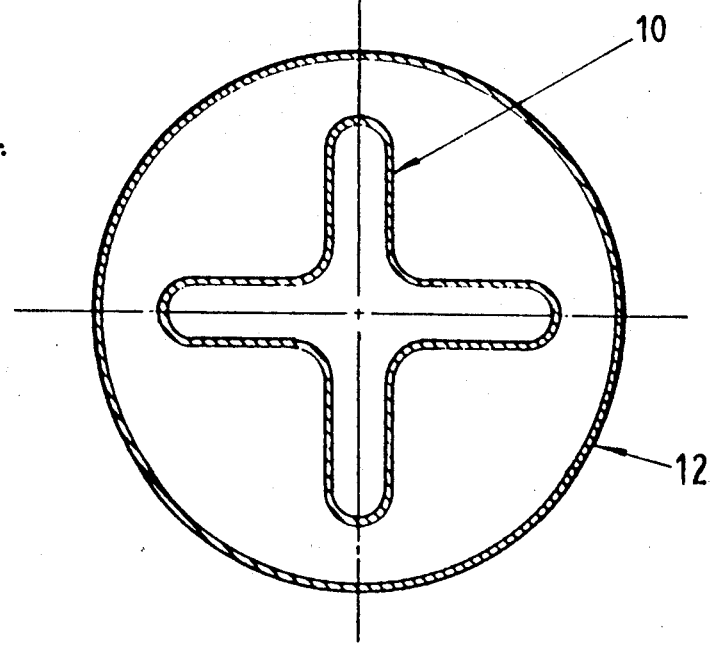
FIG. 4 shows the relative sizes of the pleated section for a given perimeter length.

The invention will be described having reference to the production of a diaphragm for a liquid pressure tank such as a water pressure tank used for increasing the pressure of supply of water where relatively low pressure supplies such as tank water are available. In such systems the tank is charged with a predetermined gas pressure and water is pumped into a diaphragm in the pressure tank through the single opening under pressure until the diaphragm is filled to capacity against the gas pressure in the tank. The diaphragm material must be expansible to accommodate varying quantities of liquid as it fills and empties. Attempts have been made to have diaphragms which fold and unfold according to the amount of liquid contained therein. Furthermore it is desirable that the opening or neck of the diaphragm and therefore the size of the opening to the pressure tank vessel is maintained at a minimum dimension to reduce production costs.

It is also desirable to provide a diaphragm which can expand and contact well within its working limits thereby leading to a significant increase in its useful life and therefore fewer maintenance checks or alternatively allows an increase in the capacity for a given size of diaphragm.

Furthermore the cruciform pleats create a rolling motion against the walk of the tank during expansion or contraction thereby minimizing scuffing and frictional contact with the tank walls.

Moulding of the body region in the pleated formation as shown in the Figures enables a diaphragm of significantly larger surface area taken along the extent of the pleated portions 10 enables a smaller inner core (not shown) to be used to form the pleated portions 10, the overall dimension of the internal core being relatively small as compared to the opening 11 in the moulded diaphragm so that easy removal of the internal core can be achieved through the opening 11 of the diaphragm.

The pleated section 10 of the diaphragm enables a given perimeter length to be achieved within a relatively small overall volume and also the section has the effect of reducing the overall width of the diaphragm.

The moulding of the diaphragm in a collapsed shape as shown enables a diaphragm of greater internal capacity to be moulded in a given injection moulding machine or blow moulding machine given that the diaphragm will be able to expand to a greater size as the pleats formed in the diaphragm are expanded under pressure when in use.

Given that the diaphragm is manufactured from an elastic material enables it to expand readily and to be pulled away from the inner core after formation. At high pressure, the diameter of the opening of the diaphragm will be increased causing the opening of the diaphragm to lift up from the bell region or body region of the diaphragm whilst maintaining a seal. Thus, the diaphragm can be expanded to a point where the diameter of the opening is in fact equal to the maximum diameter of the body region of the core so that the diaphragm may be simply removed without any further stretching of the opening.

Thus relatively simple injection moulding or blow moulding techniques can be used to manufacture the diaphragm as compared with a relatively complex and inefficient rotational moulding techniques currently required with some diaphragms.

It will be appreciated that the major advantage of the method of production is that the conventional simple injection moulding techniques or blow moulding techniques may be used in the formation of the diaphragm wherein the quality control of the production is more easily maintained.

I claim:

1. A method of production of a diaphragm for a water pressure tank accumulator comprising a thin walled flexible membrane envelope having two regions of differing geometry, one region including an apertured neck region incorporating a single opening into the membrane envelope and adapted to be secured in an opening in the pressure tank accumulator, and a second region forming the body of the diaphragm and adapted to expand and contract within the pressure accumulator during use, said second region having a relaxed, molded contracted shape in the form of a cruciform pleated configuration, said diaphragm having an expanded lateral dimension and a contracted lateral dimension; comprising the step of moulding said diaphragm in a contracted cruciform pleated configuration using inner and outer mould members such that the overall contracted lateral dimension of said second region relative to the size of the apertured neck region of the moulded diaphragm is small thereby allowing easy removal of said inner mould through the apertured neck region of said diaphragm.

2. A water pressure tank accumulator diaphragm comprising a molded thin walled flexible membrane envelope having two regions of differing geometry, one region including an apertured neck region incorporating a single opening into the membrane envelope and adapted to be secured in a single relatively narrow opening in the poressure tank through which the membrane envelope is adapted to be fitted, and a pleated second region that has a cruciform pleated configuration when in its contracted, relaxed as molded condition, said pleated second region forming an enclosed body of the diaphragm and being adapted to expand and contract within the pressure tank accumulator when in use, said diaphragm having a given lateral dimension according to whether it is in an expanded or contracted condition during use under the influence of water pressure in the pressure tank accumulator, wherein said second region has a lateral dimension when contracted which is relatively small and a lateral dimension when expanded which is relatively large as compared with the dimension of said opening in the pressure tank accumulator.

3. A water pressure tank accumulator as claimed in claim 2 wherein the reduced lateral dimension of said pleated second region when contracted is small relative to the size of the pressure tank accumulator opening.

4. A diaphragm as claimed in claim 2 or claim 3 wherein the pleats are symmetrical.

5. A diaphragm as claimed in claims 2, 3 or 4 wherein the construction of the cruciform pleats create a rolling action against the wall of the pressure tank in use during expansion and contraction of the diaphragm.

* * * * *

UNITED STATES PATENT AND TRADEMARK OFFICE
CERTIFICATE OF CORRECTION

PATENT NO. : 5,044,511

DATED : September 3, 1991

INVENTOR(S) : Hugh McDonald

It is certified that error appears in the above-identified patent and that said Letters Patent is hereby corrected as shown below:

Claim 2, column 4, line 31, delete "poressure" and substitute therefor --pressure--.

Signed and Sealed this

Ninth Day of February, 1993

Attest:

STEPHEN G. KUNIN

Attesting Officer

Acting Commissioner of Patents and Trademarks